No. 726,440. PATENTED APR. 28, 1903.
W. W. LAINGOR.
DRAFT EQUALIZER.
APPLICATION FILED JULY 31, 1902.
NO MODEL.
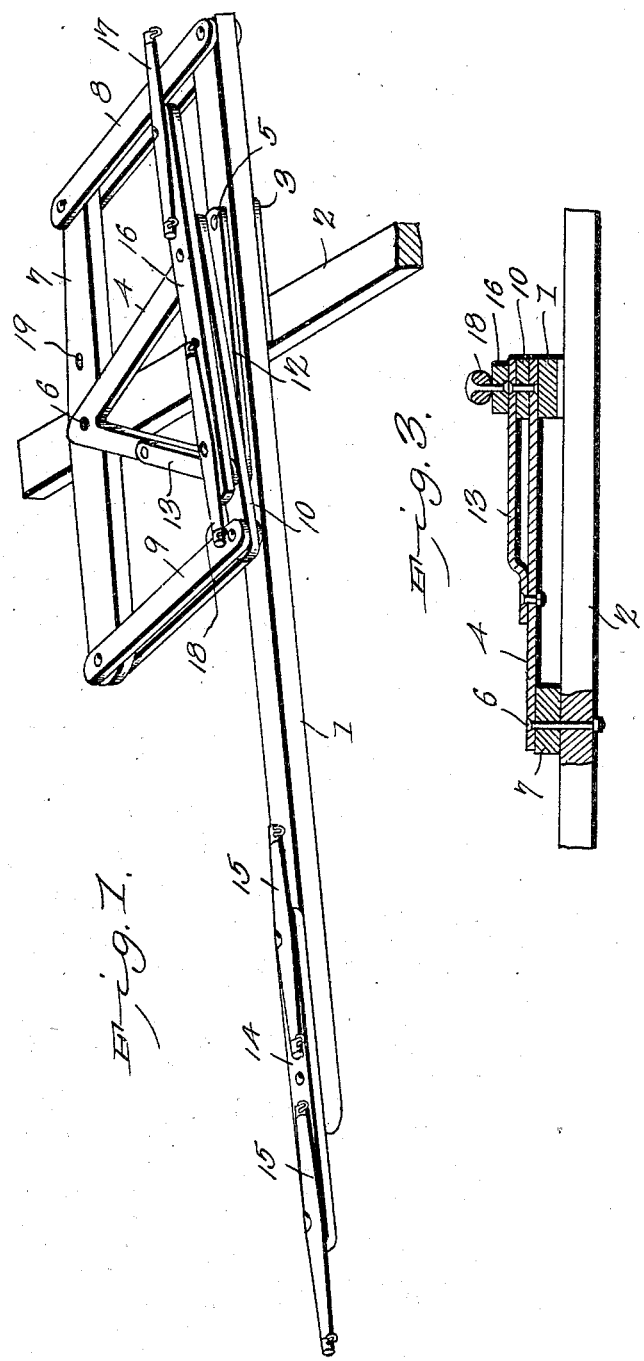
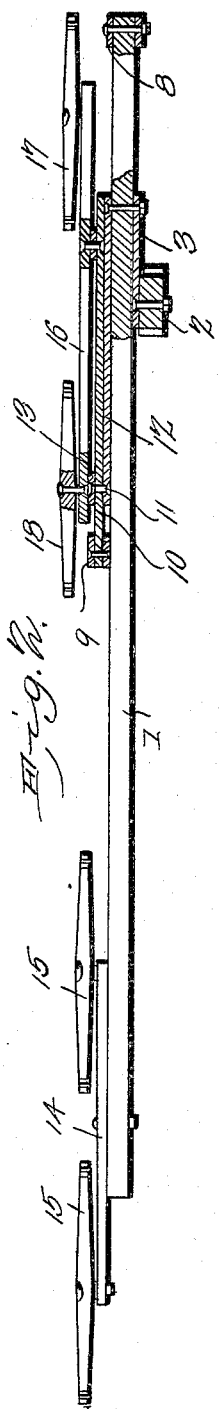
Witnesses
W. W. Laingor, Inventor

UNITED STATES PATENT OFFICE.

WILLIAM WALTER LAINGOR, OF WINFIELD, KANSAS.

DRAFT-EQUALIZER.

SPECIFICATION forming part of Letters Patent No. 726,440, dated April 28, 1903.

Application filed July 31, 1902. Serial No. 117,896. (No model.)

*To all whom it may concern:*

Be it known that I, WILLIAM WALTER LAINGOR, a citizen of the United States, residing at Winfield, in the county of Cowley and State of Kansas, have invented a new and useful Draft-Equalizer, of which the following is a specification.

The invention relates to improvements in draft-equalizers.

The object of the present invention is to improve the construction of draft-equalizers and to provide a simple and comparatively inexpensive one designed for use on agricultural machinery—such as binders, plows, and the like—and capable of equalizing the draft between a horse at one side of a draft beam or pole and a number of horses at the other side of the said beam or pole and of effectually preventing side draft.

The invention consists in the construction and novel combination and arrangement of parts hereinafter fully described, illustrated in the accompanying drawings, and pointed out in the claims hereto appended.

In the drawings, Figure 1 is a perspective view of a draft-equalizer constructed in accordance with this invention. Fig. 2 is a longitudinal sectional view of the same. Fig. 3 is a transverse sectional view.

Like numerals of reference designate corresponding parts in all the figures of the drawings.

1 designates a main equalizing bar or lever extending across a draft beam or tongue 2 and fulcrumed near one end at the left-hand side of the said beam or pole on a short arm 3, consisting of a bar or piece fixed to the beam or pole and extending laterally therefrom. The short laterally-extending arm is also supported by an approximately triangular frame 4, which is perforated to receive the pivot 5 of the main equalizing bar or lever and which is located above the same. The triangular frame has its apex at the rear at a point directly over the draft beam or pole 2 and is secured thereat to the draft beam or pole by a fastening device 6, which forms a pivot or fulcrum for a rear connecting-lever 7. The rear connecting-lever 7 is connected by a pair of links 8 with the left-hand end of the main equalizing bar or lever, and its right-hand end is connected by a pair of links 9 with the right-hand end of a short supplemental equalizing bar or lever 10, fulcrumed by a bolt or other suitable fastening device 11 near its right-hand end. The triangular frame has a transverse connecting portion 12 at its front, and the pivot 11 is located at the right-hand end of the same at the right-hand side of the tongue, and the pivot 5 of the main equalizing bar or lever is located at the other end of the transverse portion 12 at the left-hand side of the tongue or pole 2. The short supplemental equalizing bar or lever is supported by a brace 13, secured to one side of the triangular frame and perforated to receive the pivot 11 of the short equalizing bar or lever.

The long arm of the main equalizing bar or lever is provided with a doubletree 14, having a pair of singletrees 15 located at the right-hand side of the pole or beam, and the long arm of the short supplemental equalizing bar or lever has pivoted to it a doubletree 16, provided with a pair of singletrees 17 and 18, located at opposite sides of the beam or pole. The singletrees 15 are spaced from the singletree 18 a sufficient distance to permit an additional singletree to be connected with the main equalizing bar or lever, and the connecting bar or lever 7 is provided at the left-hand side of the draft beam or pole with a perforation 19, adapted to receive the pivot-bolt 6 to increase the leverage to compensate for the pull of the fifth horse.

It will be seen that the draft-equalizer is simple and comparatively inexpensive in construction, that it possesses great strength and durability, and that it is capable of equalizing the draft between four or five horses and of effectually preventing side draft.

What I claim is—

1. In a draft-equalizer, the combination with a draft-beam, of a main equalizing bar or lever fulcrumed near one end at one side of the draft-beam, a reversely-arranged supplemental equalizing bar or lever fulcrumed near one end at the opposite side of the draft-beam, a rear connecting-lever connected with the short arms of the said equalizing bars or levers, and whiffletrees connected with the long arms of the equalizing bars or levers, substantially as described.

2. In a draft-equalizer the combination with a draft-beam, of a main equalizing-bar extending across the draft-beam and fulcrumed between its ends, a rear lever fulcrumed between its ends on the draft-beam and connected at one side of the same with the main equalizing-lever, whiffletrees connected with the other end of the main equalizing-lever, a reversely-arranged supplemental equalizing-lever fulcrumed between its ends and extending across the draft-beam and connected at one end with the rear lever, and whiffletrees connected with the other end of the supplemental equalizing-lever, substantially as described.

3. In a draft-equalizer, the combination of a draft-beam having a laterally-extending arm, a main equalizing bar or lever fulcrumed between its ends on the arm, an approximately triangular frame connected with the draft-beam and supporting the pivot of the main equalizing bar or lever, a supplemental equalizing bar or lever fulcrumed between its ends on the frame, a rear connecting-lever fulcrumed on the draft-beam and extending from opposite sides of the same and connected at its ends with the equalizing bars or levers, and whiffletrees mounted on the equalizing bars or levers, substantially as described.

In testimony that I claim the foregoing as my own I have hereto affixed my signature in the presence of two witnesses.

WILLIAM WALTER LAINGOR.

Witnesses:
J. E. JARVIS,
J. F. BALLIET.